(12) United States Patent
Simonutti et al.

(10) Patent No.: US 7,067,081 B2
(45) Date of Patent: Jun. 27, 2006

(54) METHOD OF MAKING A GOLF BALL PRODUCT FROM FAST-CURLING REACTION INJECTION MOLDED POLYURETHANE

(75) Inventors: Frank M. Simonutti, Jackson, TN (US); Richard D. Matheny, Cedar Grove, TN (US); Ralph E. Peterson, Jackson, TN (US)

(73) Assignee: Wilson Sporting Goods Co, Chicago, IL (US)

( * ) Notice: Subject to any disclaimer, the term of this patent is extended or adjusted under 35 U.S.C. 154(b) by 425 days.

(21) Appl. No.: 09/760,431

(22) Filed: Jan. 12, 2001

(65) Prior Publication Data
US 2002/0016435 A1 Feb. 7, 2002

Related U.S. Application Data

(63) Continuation-in-part of application No. 09/176,445, filed on Oct. 21, 1998, now abandoned.

(51) Int. Cl.
*B29C 45/14* (2006.01)

(52) U.S. Cl. .............................. 264/279.1; 264/328.18; 264/328.6

(58) Field of Classification Search ............. 264/279.1, 264/328.18, 328.6
See application file for complete search history.

(56) References Cited

U.S. PATENT DOCUMENTS

| 3,112,521 | A | | 12/1963 | Ward |
| 3,979,126 | A | * | 9/1976 | Dusbiber .................... 473/372 |
| 4,218,543 | A | * | 8/1980 | Weber et al. .................. 521/51 |
| 4,714,575 | A | | 12/1987 | Preston |
| 4,727,094 | A | * | 2/1988 | Hoy et al. ................... 521/164 |
| 5,688,191 | A | | 11/1997 | Cavallaro et al. |
| 5,692,974 | A | | 12/1997 | Wu et al. |
| 5,759,676 | A | | 6/1998 | Cavallaro et al. ........... 428/215 |
| 5,803,831 | A | | 9/1998 | Sullivan et al. ............. 473/374 |
| 5,810,678 | A | | 9/1998 | Cavallaro et al. ........... 473/373 |
| 5,813,923 | A | | 9/1998 | Cavallaro et al. ........... 473/373 |
| 5,849,168 | A | * | 12/1998 | Lutz ........................... 264/255 |
| 5,885,172 | A | | 3/1999 | Herbert et al. .............. 473/354 |
| 5,908,358 | A | | 6/1999 | Wu .............................. 473/378 |
| 5,947,843 | A | | 9/1999 | Calabria et al. ............ 473/377 |
| 6,083,119 | A | * | 7/2000 | Sullivan et al. ............. 473/354 |
| 6,132,324 | A | | 10/2000 | Hebert et al. ............... 473/378 |
| 6,290,614 | B1 | | 9/2001 | Kennedy et al. |
| 6,309,313 | B1 | | 10/2001 | Peter |

FOREIGN PATENT DOCUMENTS

| GB | 2 048 154 A | 4/1979 |
| WO | WO 00/57962 | 10/2000 |

* cited by examiner

*Primary Examiner*—Edmund H. Lee

(57) ABSTRACT

Golf ball products are made by reaction injection molding (RIM) fast curing thermoset polyurethane compounds. A polyurethane prepolymer and a curing agent are mixed and injected at low temperature and pressure into a closed mold where the reaction mixture gels. The mold is opened and the golf ball product is removed within 10–60 seconds after the injection step.

16 Claims, 7 Drawing Sheets

METHOD OF MAKING A GOLF BALL PRODUCT FROM FAST-CURING REACTION INJECTION MOLDED POLYURETHANE

RELATED APPLICATION

This application is a continuation-in-part of U.S. patent application entitled "Reaction Injection Molded Golf Ball," Ser. No. 09/176,445 abandoned, filed Oct. 21, 1998.

BACKGROUND

This invention relates to golf balls, and, more particularly, to a golf ball having a core and a cover, either or both of which are formed by reaction injection molding fast curing thermoset polyurethane compounds.

Golf balls which are currently available fall into two general categories—balls which include a balata cover and balls which include a more durable, cut-resistant cover. Balata covers are made from natural balata, synthetic balata, or a blend of natural and synthetic balata.

Balata (trans-polyisoprene) was the primary material used for golf ball covers until the late 1960's. Balata covered golf balls were (and are) preferred by many golfers, primarily professional and low handicap golfers, because of the soft feel and because of the control which the better player can impart to the ball. However, balata covered golf balls are expensive, and difficult to produce. The process for producing a balata covered golf ball includes mixing of rubber, pre-forming half shells of the rubber compound, compression molding the half-shells around a wound golf ball core, post-curing the balata covers, and finishing the ball. The process is very labor intensive and expensive.

Conventional balata covered golf balls are produced by winding resilient, low heat-resistant elastic thread over a soft rubber or liquid rubber center, which must first be frozen to permit winding the rubber thread, and molding a conventional soft balata cover over the windings. The balata is conventionally vulcanized or crosslinked by using sulfur as the crosslinker or vulcanizing agent.

Most cut-resistant covers utilize Surlyn ionomer, which is an ionic copolymer of methacrylic acid and ethylene available form E. I du Pont de Nemours & Co. Other cut-resistant materials which can be used in golf ball covers are ionic copolymers available from Exxon under the name Iotek, which are similar to Surlyn ionic copolymers except that acrylic acid is used rather than methacrylic acid.

DuPont introduced ionomers in the late 1960's under the trade name Surlyn. Ionomers are copolymers of an olefin (generally ethylene), and an alpha-beta ethylenically unsaturated carboxylic acid (generally methacrylic acid). Neutralization of a number of the acid groups is effected with metal ions, currently chosen from the group of sodium, lithium, zinc and magnesium.

Ionomer covers are more durable than balata, and are currently the material of choice on most solid core, and many wound core, golf balls. Ionomers are thermoplastic materials, which allows (on sold cores) for the cover material to be injection molded around the core using a conventional injection molding process, that is, heating the thermoplastic material to above its melting point to a point where it will flow, and "injecting" the material in its molten state into a closed mold. The ionomer (thermoplastic material) cools and returns to its solid form, and can be removed from the mold easily. Thermoplastic materials are beneficial in that they can be heated, re-shaped, and cooled repeatedly, with no significant change in properties (as long as thermal decomposition does not occur). Ionomer covers, however, do not produce properties comparable to balata, and therefore are generally not considered acceptable for a premium golf ball.

Surlyn covered balls are cheaper than balata balls not only because Surlyn is cheaper than balata but because Surlyn balls can be processed after molding much easier and faster than balata balls.

The term "3 piece" is commonly used to refer to a golf ball which has a center, a layer of elastic windings over the center, and a cover. The term "2 piece" is used to refer to a golf ball which has a solid core and a cover.

Surlyn covered balls can be either 3 piece or 2 piece balls. Other variations include a solid core and two or more cover layers and a solid core, a mantle surrounding the core, and one or more cover layers over the mantle.

Other soft thermoplastic materials (such as thermoplastic polyurethanes, thermoplastic polyester elastomers, polyether block amide copolymers, etc.) have been used as covers on golf balls, with limited success. Although these materials, being thermoplastic, can be processed using conventional injection molding techniques as described above, these materials generally produce insufficient resilience properties to be used as covers for premium golf balls. U.S. Pat. Nos. 5,668,191, 5,759,676, 5,810,678 and 5,813,923 all illustrate the use of a thermoplastic polyurethane material as a mantle material. Thermoplastic polyurethane materials have also been used in blends with other materials, such as ionomers. U.S. Pat. No. 4,674,751 describes blends of thermoplastic polyurethanes with ionomers.

More recently, wound golf balls made using thermoset polyurethane materials for covers have been developed. Balls molded using thermoset polyurethane have many properties comparable to balata—similar feel (slightly harder) and comparable performance properties. Thermoset compositions suitable for use as cover materials for golf balls are described in U.S. Pat. Nos. 3,979,126, 3,989,568, 4,123,061 and 5,334,673. In all of the cited patents, a slow curing process is described. More specifically, in U.S. Pat. No. 3,979,126, the polyurethane cover requires a molding time of 45 minutes at 115° C., and 5 hours of curing time after demolding. In U.S. Pat. No. 3,989,568, half-shells are molded (for 5 minutes), and the polyurethane cover is compression molded around a core for 5.5 minutes, and required to post cure for 2 weeks at ambient temperatures. U.S. Pat. No. 4,123,061 (a continuation of U.S. Pat. No. 3,979,126), again describes a molding time of 45 minutes and a post-curing time of 5 hours at 100° C. U.S. Pat. No. 5,334,673 describes the need for an initial step of forming the urethane around the core, an intermediate curing step of 5 to 30 minutes which allows for the polyurethane cover material to retain the dimple form from the final molding step, and a final curing (molding) process of about 8 minutes. In all cases, the molding of thermoset polyurethane covers as defined in these patents is performed using compression molding processes.

There have also been a number of patents that describe a method for molding a thermoset polyurethane cover around a golf ball. U.S. Pat. No. 5,006,297 describes introducing a polyurethane into an open mold, allowing it to partially cure prior to introducing a core, introducing a core and molding the urethane around the core (an intermediate curing step), and then re-molding the urethane covered golf balls in mold cavities to form the dimple pattern. This process requires two separate molding operations and an overall process time of 2-plus hours. U.S. Pat. No. 5,733,428 describes introducing a thermoset polyurethane material into half-shells, closing a mold, and allowing the urethane material to cure for 10 to 15 minutes. This is performed in a multi-step operation, with material poured into each half of the mold in a separate operation, and the mold closed to "compression mold" the ball. U.S. Pat. No. 5,888,437 is a continuation of U.S. Pat. No. 5,733,428 and describes a process where the material and core are introduced into a mold, the mold is placed into a curing oven for 10 minutes, and then placed into a cooling chamber for another 10 minutes. U.S. Pat. No. 5,947,843 is also a continuation of U.S. Pat. No. 5,733,428, and describes a similar molding method to the other patents, that is, pouring urethane into open mold halves, then closing the mold, and curing the polyurethane. U.S. Pat. No. 6,132,324 describes the same process as U.S. Pat. No. 5,947,843, but pertaining to a multi-layer golf ball construction.

U.S. Pat. No. 6,083,119 describes a multi-layer golf ball. Column 13, lines 13–25 and column 43, lines 43–52 state that the inner and outer cover layers can be formed from materials which include thermoplastic or thermosetting polyurethanes/polyureas, including reaction injection moldable polyurethanes/polyureas. Column 19, lines 55–62 states that the inner and/or outer cover layer may comprise a thermoplastic polyurethane or a reaction-injection molded material such as one or more of the Bayflex RIM polyurethanes from Bayer. The patent does not describe any specific example of a golf ball which uses RIM polyurethane in either the inner cover layer or outer cover layer. The patent does not describe any process which molds RIM polyurethane.

Thermoplastic materials are generally processed using conventional injection molding techniques (heating a thermoplastic material under pressure until it reaches a molten state, injected into a closed mold, cooled until it returns to a solid state, and de-molded).

Thermoset materials used as covers for golf balls are all described as having either half-shells or material in its pre-cure form (urethane) introduced into an open mold, closing the mold, molding the cover under sufficient heat and pressure and allowing it to cure sufficiently to de-mold, cooling the mold, nd removing the molded part from the mold. In some cases, a post-curing step is required to complete the curing of the thermoset material.

SUMMARY OF THE INVENTION

The invention consists of a method of molding a golf ball product by a "Reaction Injection Molding" process. This molding method allows for the introduction of a thermoset material (preferably as polyurethane) into a closed mold, around a centered wound or solid core, and allows for sufficient curing to allow de-molding of the golf ball within 60 seconds of the introduction of the thermoset material.

Reaction injection molding differs from conventional injection molding in that a thermoset material is used. In conventional injection molding of thermoplastic materials (materials which can be reprocessed a number of times), the solid thermoplastic is fed into the barrel of an injection press. A rotating screw conveys the material through the barrel, while heating the thermoplastic into a molten state. The molten thermoplastic material is then injected into a closed mold, and cooled to return it to solid form. The resultant product is then removed from the mold.

Reaction injection molding is at process for injection molding of a thermoset material. Thermoset materials, once crosslinked, cannot be processed by applying heat and pressure. Thermoset materials must be introduced into the closed mold and crosslinked (or cured) during the process. Conventional injection molding processes cannot be utilized for thermoset polyurethane (or any thermoset material) for this reason.

Reaction injection molding differs from the cast process described in the patents cited earlier in that it consists of a one-step process, the simultaneous mixing of the reaction components and introduction of the reaction mixture is introduced into a closed mold. All of the other process descriptions indicate the introduction of a slow curing material into an open mold, then closing the mold to complete the curing of the part.

The "reaction injection molding" procedure utilized in the invention consists of introducing two components (an isocyanate, and an isocyanate reactive compound) into a mixing head, mixing the two materials sufficiently to result in acceptable reaction product, simultaneously injecting the reaction mixture into the closed mold, allowing the reaction mixture sufficient time in the mold to cure, and demolding the product. The reaction components must be introduced into the mixhead at a sufficient pressure and dispersion to allow for good mixing of the components and to allow for consistent properties throughout the entire "shot".

The mold used for reaction injection molding differs from a conventional injection mold in that the runner system is designed to further mix the reaction components as they are injected into the mold. The material then flows into the cavities through a single "fan" shaped gate. The cavities are designed with a single vent gate, which is also "fan" shaped but has a significantly smaller cross-sectional area than the injection gate.

DESCRIPTION OF THE DRAWINGS

The invention will be explained in conjunction with an illustrative embodiment shown in the accompanying drawing, in which.

DESCRIPTION OF SPECIFIC EMBODIMENTS

Figure 1:
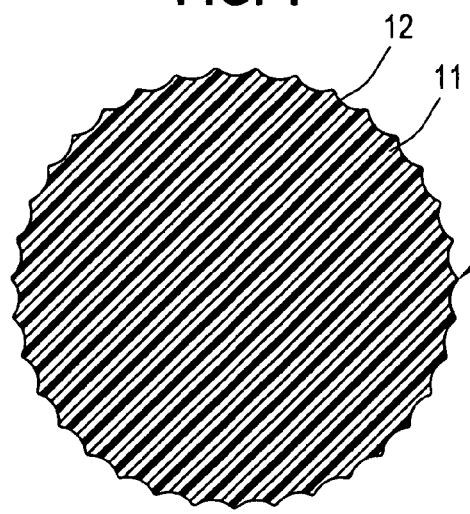
FIG. 1 is a sectional view of a solid polyurethane golf ball which is formed in accordance with the invention.

FIG. 1 illustrates a solid golf ball 10 which is reaction injection molded from thermoset polyurethane as will be described in detail herein. The ball includes a homogeneous core 11 having an outer surface which includes conventional concave dimples 12.

Figure 2:
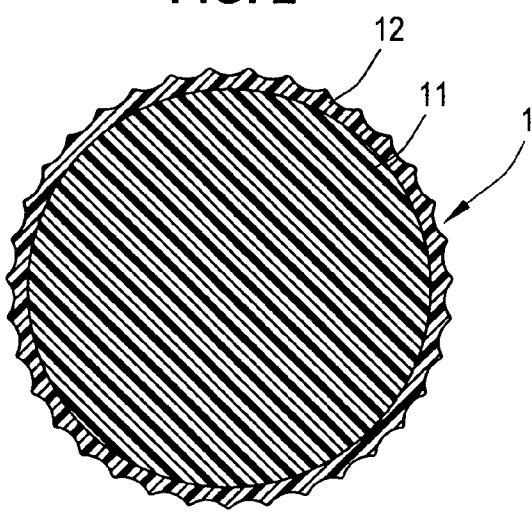
FIG. 2 is a sectional view of a two piece golf ball with a polyurethane cover which is formed in accordance with the invention.

FIG. 2 illustrates a solid 2 piece golf ball 13 which includes a solid core 14 and a dimpled cover 15 which is reaction injection molded from thermoset polyurethane in accordance with the invention.

Figure 3:
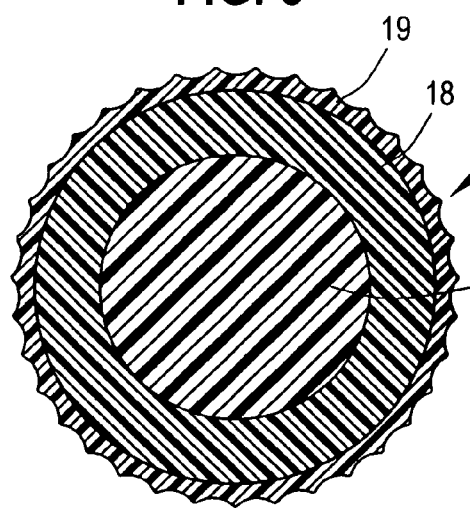
FIG. 3 is a sectional view of a golf ball having a mantle and a cover, either or both of which are formed in accordance with the invention.

FIG. 3 illustrates a solid ball 16 which includes a core 17, a mantle 18, and a dimpled cover 19. Either or both of the mantle and the cover can be reaction injection molded from thermoset polyurethane.

Figure 4:
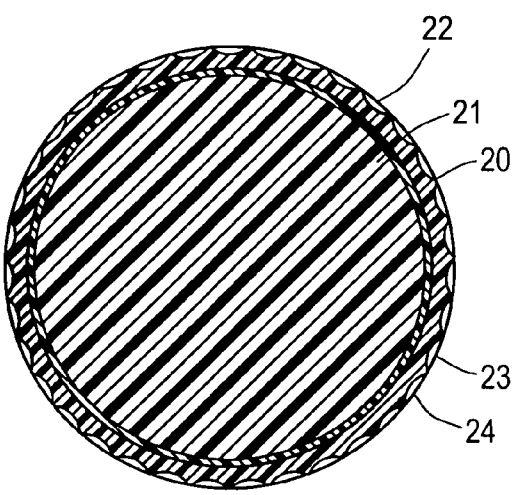
FIG. 4 is a sectional view of a solid golf ball having two cover layers, either or both of which are formed in accordance with the invention.

FIG. 4 illustrates a solid ball 20 having a core 21 and a two-layer cover 22. The cover includes an inner layer 23 and an outer layer 24. Either or both of the cover layers can be reaction injection molded from thermoset polyurethane.

Figure 5:
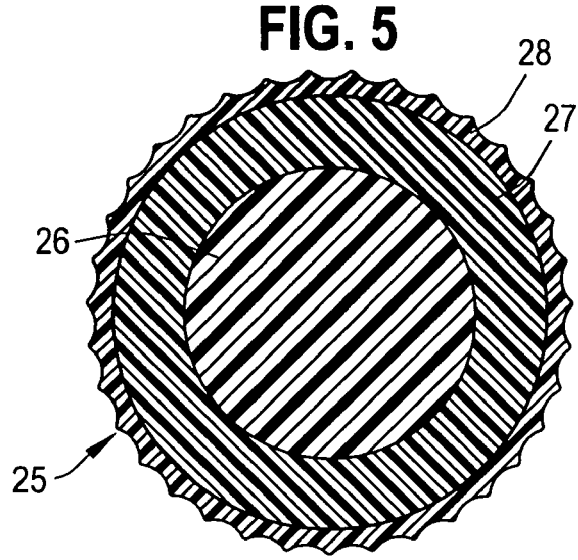
FIG. 5 is a sectional view of a 3 piece wound golf ball with a cover which is formed in accordance with the invention.

FIG. 5 illustrates a 3 piece ball 25 which includes a center 26, a layer 27 of elastic windings, and a cover 28. The cover is reaction injected molded from thermoset polyurethane.

Polyurethane compounds suitable for reaction injection molding can be made by mixing the following components:

1. An aromatic or aliphatic diisocyanate (and/or diisocyanate prepolymer) having a viscosity (at 25° C.) of less than 1,000 cps. Examples of suitable diisocyanate are as follows:
   a) TDI (Meta-toluene diisocyanate);
   b) MDI (4,4'-Diphenylmethane diisocyanate);
   c) PMDI (Polymeric diisocyanate);
   d) TODI (3,3'-dimethyl-4,4'biphenyl diisocyanate);
   e) NDI (Naphthalene diisocyanate);
   f) PPDI (Para-phenylene diisocyanate);

2. A polyol and/or diamine curing agent, having a viscosity (at 25° C.) of less than 2,000 cps. Examples of suitable polyol/diamine curing agents are as follows:
   a) Polyether-based polyols (such as polypropylene oxide based polyols);
   b) Amine curing agents (such as Diethyltoluenediamine);
   c) Polyester-based polyols, (such as):
      i. Adipates, isophthalates, phthalates, terephthalates;
      ii. Polycaprolactones;
      iii. polycarbonates;

Other components can also be used for making fast curing thermoset polyurethane compounds.

The polyurethane compounds can include additives such as chain extenders (polyol or polyamine), stabilizers, and colorants.

Figure 6:
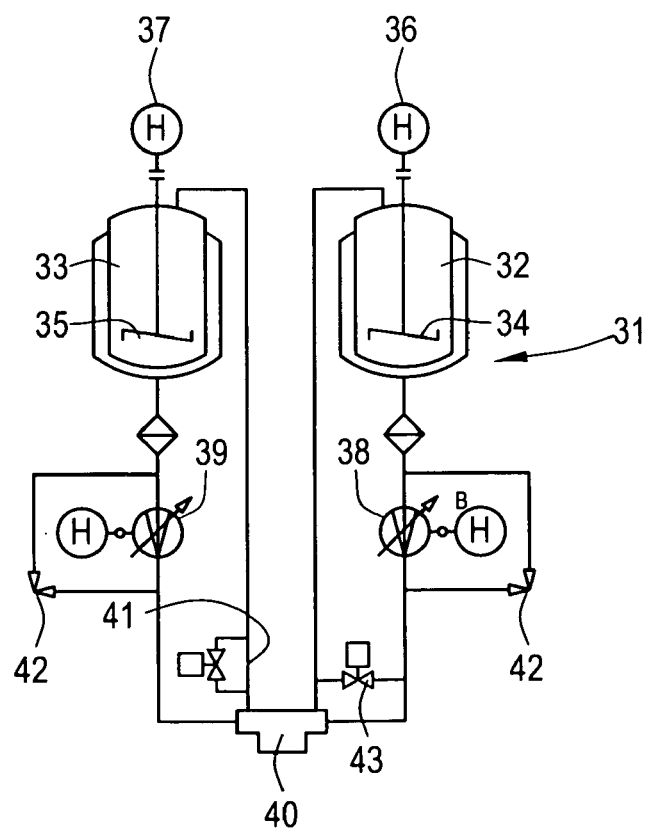
FIG. 6 is a schematic diagram of a mixing apparatus for forming polyurethane compounds.

FIG. 6 illustrates a high pressure polyurethane metering/injection machine 31 which is suitable for use with the invention. The prepolymer and curing agent for making the polyurethane compound are mixed in mixing tanks 32 and 33. The mixing tanks include stirring rods 34 and. 35 which are rotated by motors 36 and 37. Each component is metered by a metering unit 38, 39 to an impingement mixing head 40. The pressure of the component in tank 33 is controlled by pressure control valve 41, and excessive pressure can be relieved by relief valves 42. A bypass valve 43 permits low pressure recirculation back to the mixing tank 32 when the mixing head is not being filled.

Once the reacting materials have been introduced into the impingement mixing head 40, the mixing head is connected to a mold, and the reacting materials are transferred to the mold. The mixing head can include an injection button for forcing the reacting materials from the mixing head to the mold under relatively low pressure.

Figure 7:
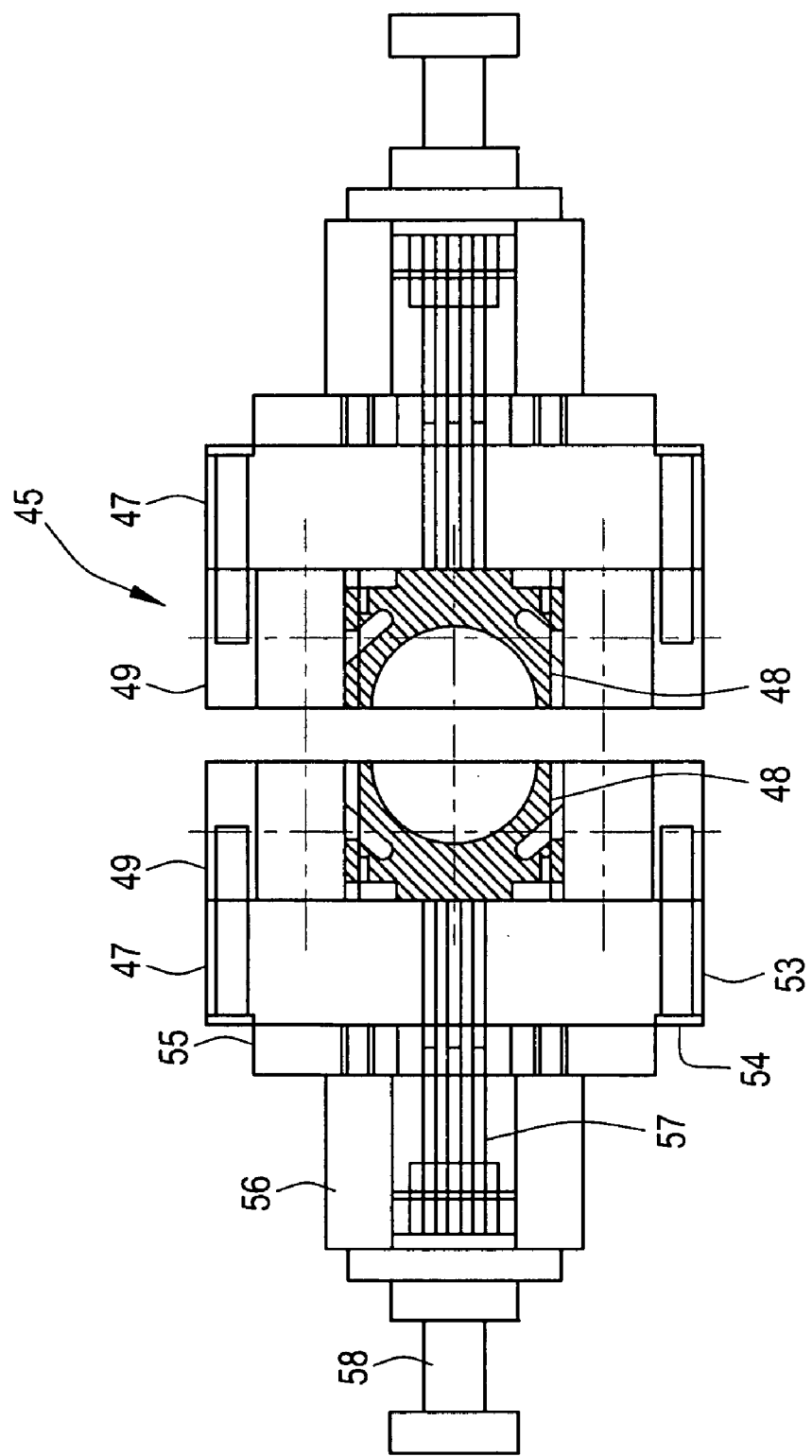
FIG. 7 is a side view, partially in section, of a two-part mold for reaction injection molding golf ball products.

FIG. 7 illustrates a reaction injection mold 45 for molding thermoset polyurethane golf ball products. The mold 45 is a two-part mold and includes mold halves 46 and 47. Each mold half includes a mold 49 which is mounted in a cavity plate 49. The mold is provided with a generally hemispherical mold cavity 50 which is defined by a mold surface 51.

The cavity plate is secured to a retainer plate 53 by pins 54. An adapter plate 55 is secured to the retainer plate and supports a pin block 56. A plurality of pins 57 are mounted for reciprocation by a hydraulic cylinder 58. The pins may be extended into the mold cavity to hold the core in the mold cavity so that reacting materials can be injected around the core. The pins could also be controlled pneumatically or electronically.

If a polyurethane cover or mantle is to be molded over a core, the pins 57 are extended into the molds 48, the core is positioned between the mold halves, and the mold halves are closed. The reacting materials are injected into the mold and fill the space between the core and the mold surfaces 51. Once the mold cavity is filled, the pins 57 are retracted. If a cover is being molded, the mold surfaces 51 of the molds 48 are provided with conventional projections for forming dimples in the molded cover. The pins 57 are only partially retracted so that the ends of the pins extend beyond the mold surfaces to form dimples in the cover. If a mantle or an inner cover layer is being molded, the pins retract so that they are flush with the mold surfaces 51 and form part of the spherical mold surface.

The time needed for mixing and flowing the reacting materials into the mold will vary from 0.5 seconds to 10 seconds depending upon the material and the ratio of prepolymer and curative. To assist in curing of materials to attain a workable gel time, temperature of the mold will need to be maintained between 70 and 200 degrees F. After the gel time is complete, the mold is opened to remove the molded part. The pins 57 can be extended at this time to aid in removing the part and to ready the mold for the start of the next cycle.

The molds 48 can be changed depending upon the part which is being molded. The diameter of a core or a mantle-covered core which can be inserted into the mold can range from 0.75 inch to 1.610 inch. If a solid polyurethane golf ball is to be molded, the mold halves are closed without inserting a core. Reacting material is injected into the entire cavity.

Figure 8:
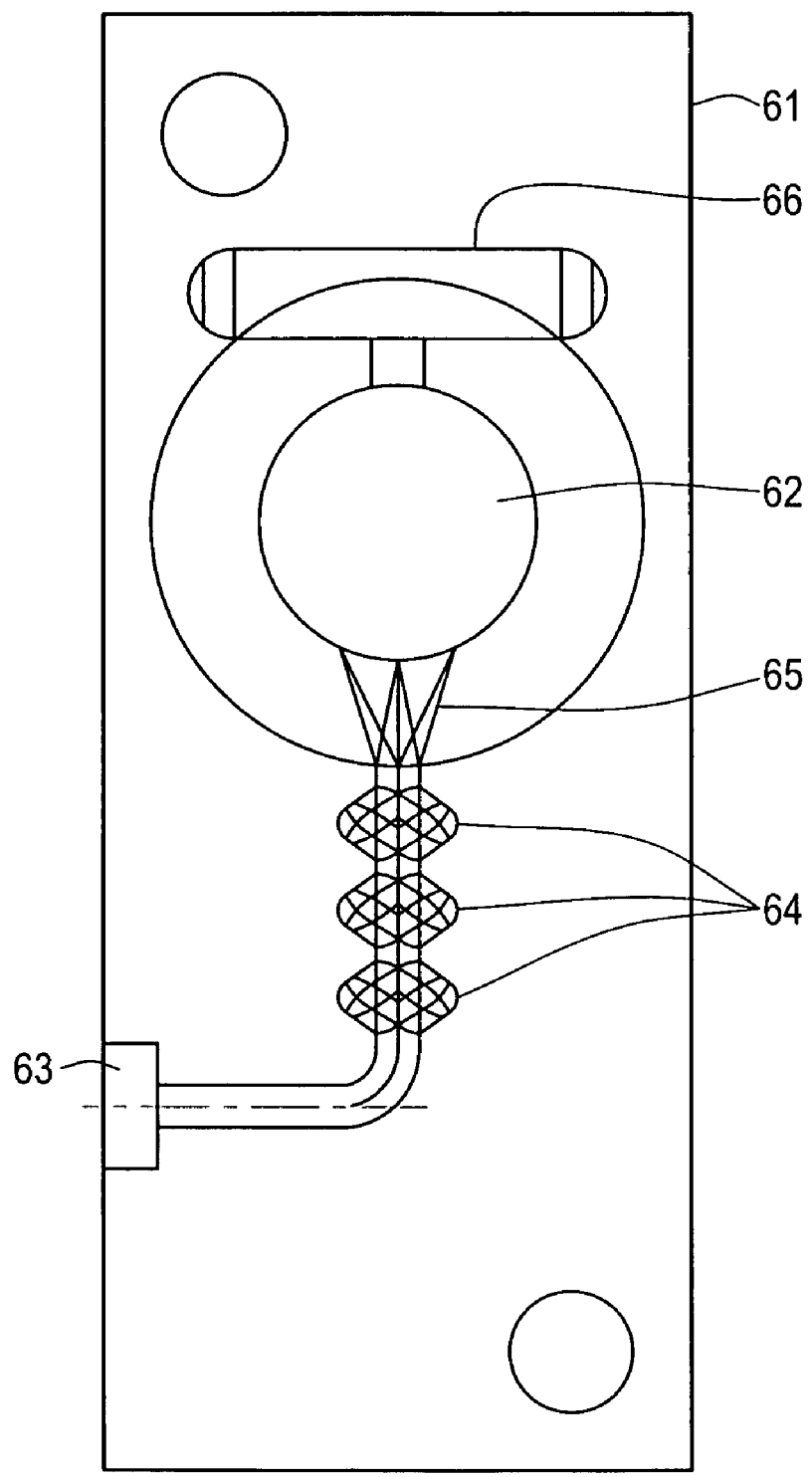
FIG. 8 is a sectional view of a mold for reaction injection molding golf ball products.

FIG. 8 illustrates another mold 61 for reaction injection molding golf ball products in accordance with the invention. The mold is provided with a mold cavity 62 and an inlet opening 63 for the reacting materials. The reacting materials pass through mixing chambers 64 and through a fanned gate 65 into the cavity. The fanned or shallower gates lessen or prevent the formation of air bubbles during molding. An overflow chamber 66 above the mold collects air which escapes from the reacting materials. After the gel time is complete, the mold is opened to remove the molded part.

The fan gate at the point of injection into the cavity has a width of 18 mm (about 0.70 inch) and a depth of 0.020 inch. A vent gate for the cavity has a width of 6–35 mm (about 0.25 inch) and a depth of 0.020 inch. The runner through which the material flows from the inlet opening 63 has a diameter of 4 mm, and the profile of the runner changes as it becomes a single gate having a width of 18 mm and a depth of 0.020 inch.

As previously described, reaction injection molding can be used to mold a solid core or golf ball, a mantle layer over a core, an inner or outer cover layer of a two-cover ball, and/or a cover for a wound golf ball. The foregoing molded parts are referred to generically herein as "golf ball products."

Figure 9:
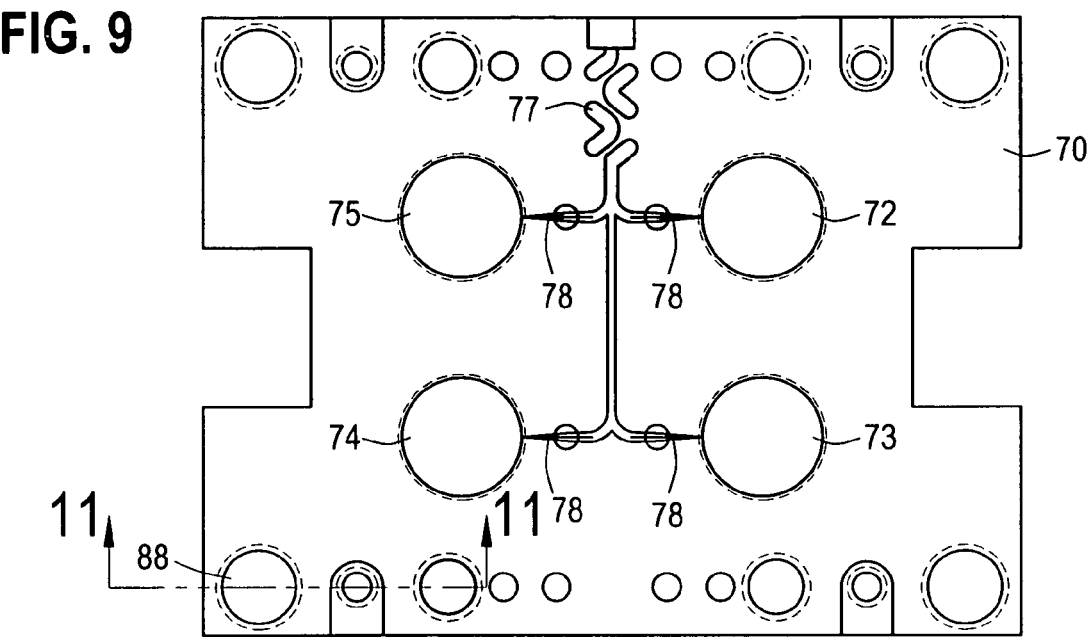
FIGS. 9 and 10 illustrate top and bottom mold plates, respectively, for a four cavity mold for reaction injection molding golf balls covers.
Figure 10:
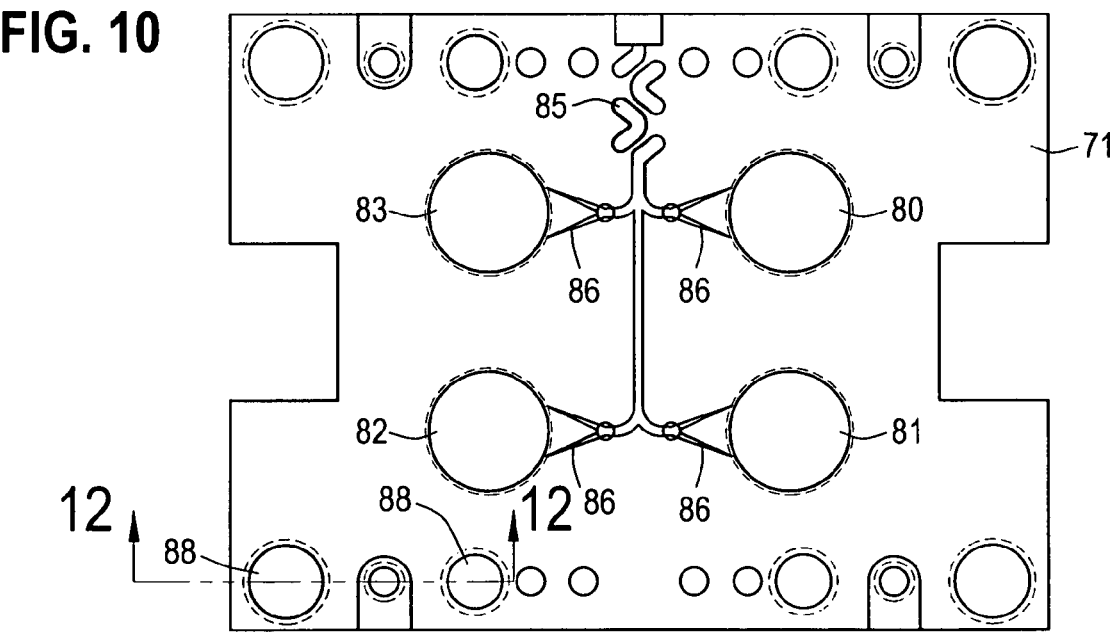
Figure 11:
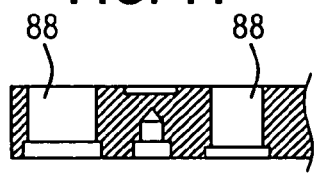
FIG. 11 is a sectional view taken along the lines 11—11 of FIG. 9.
Figure 12:
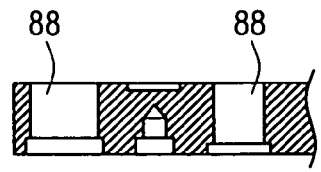
FIG. 12 is a sectional view taken along the lines 12—12 of FIG. 10.

FIGS. 9 and 10 illustrate a top cavity retainer plate 70 and a bottom cavity retainer plate 71 for a four cavity reaction injection mold. The mold plate 70 is provided with four hemispherical mold cavities 72, 73, 74 and 75, an inlet opening 76, mixing chamber 77, and a gate 78 for each cavity. Each of the cavities 72–75 retain a hemispherical half shell or cavity half for molding one-half of a golf ball.

The mold plate 71 is similarly provided with four hemispherical mold cavities 80, 81, 82 and 83, an inlet opening 84, and mixing chamber 85. A gate 86 is provided for each cavity. The gates 86 have the dimensions which were previously described.

The mold plates are provided with openings 88 for guide pins which permit the mold plates to open and close. When the mold plates are closed, the hemispherical cavities form spherical cavities, and the gates 78 and 86 form a fan-shaped gate for each cavity.

Figure 13:
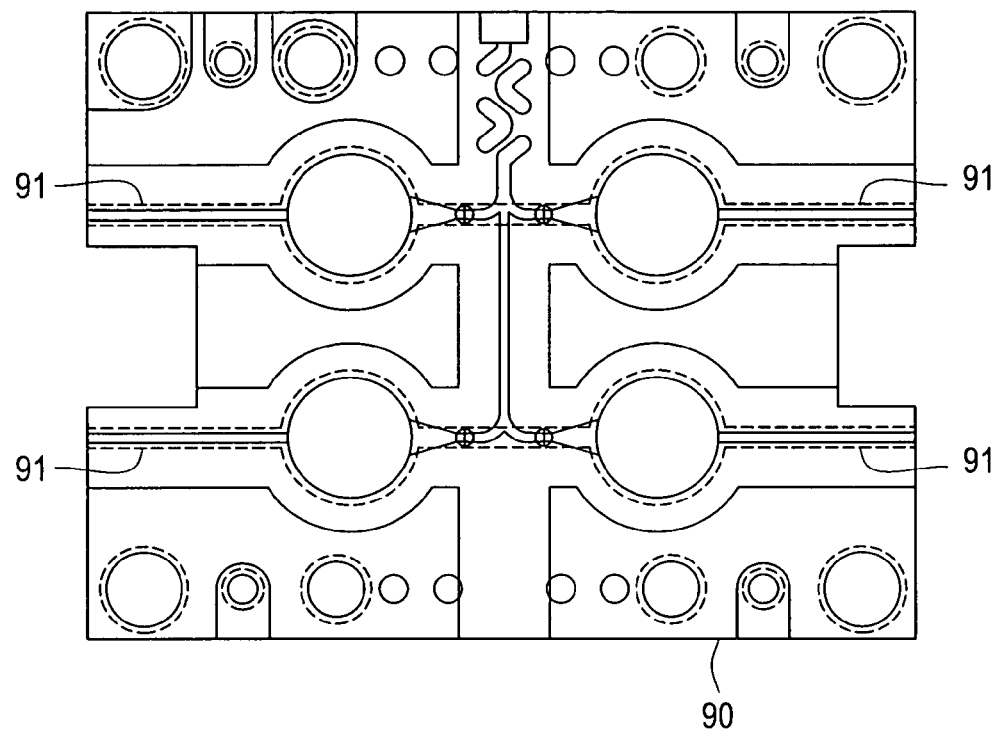
FIG. 13 illustrates another bottom cavity retainer plate.
Figure 14:
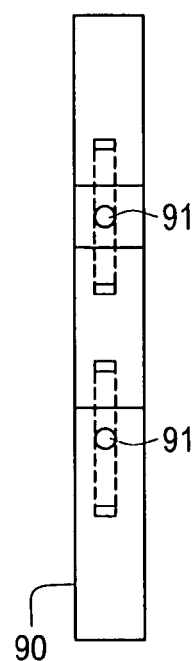
FIG. 14 is a side view of the cavity retainer plate of FIG. 13.

FIGS. 13 and 14 illustrate a bottom cavity retainer plate 90 which is similar to the bottom cavity retainer plate 71. Each of the mold cavities is vented by a vent gate 91 which has a width of 0.25 inch and a depth of 0.020 inch.

The reaction injection molding of the cover of a golf ball consists of:
Isocyanate Temperature—100–130° F.
Polyol Temperature—100–130° F.
Raw Material Tank Pressure (Air pressure)—40–80 psi
Isocyanate Pressure—1000–3000 psi
Opening the mold; and
Removing the molded golf ball from the mold.
Machine conditions should be within the following ranges:
Isocyanate Temperature—100–130° F.
Polyol Temperature—100–130° F.
Raw Material Tank Pressure (Air pressure)—40–180 psi
Isocyanate Pressure—1000–3000 psi
Polyol Pressure—1000–3000 psi
Mold Temperature—130–200° F.
Inject Time—less than 10 seconds

EXAMPLES

The invention will be further explained with reference to the following specific examples.

Example I

Polyol/diamine component is maintained at a temperature of 80–150° F., more preferably at a temperature of 95–120° F.

Isocyanate/isocyanate prepolymer component is maintained at a temperature of 80–130° F., more preferably at a temperature of 95–120° F.

Mold temperature is kept between 70 and 200 degrees F. Preferable mold temperature is 140–170° F.

Molding Process:
1. Core (wound core, solid core, or solid core with mantle) is inserted into the mold. Pins are extended into the mold cavity (cavities) to center the core(s). Mold is closed.
2. Polyol/diamine component and isocyanate component are shot into the mixing head as follows:
Polyol-diamine is shot into the mixing head at a pressure of 1,200–2,900 psi, preferably at a pressure of about 2,000 psi.
Icoyanate component is shot into the mixing head at a pressure of 1,200–2,900 psi, preferably at a pressure of about 2,500 psi.

The ratio of Polyol/diamine component to isocyanate component will vary based upon the grade of material utilized (hardness level, etc.)

Polyol/diamine component and isocyanate component are shot into the mixing head at a combined "throughput" amount of 35–200 g/s, for a mixing time of 0.5–10 seconds, based upon the reaction time and amount of material required to fill cavity (cavities).

Note: for single cavity mold, preferable conditions are a throughput rate of 35–50 g/s and a mixing time of 0.5–1.0 seconds.

3. Mixture of Polyol/diamine and isocyanate components are injected into the mold, at a set (low) pressure. Injection is generally completed within 5 seconds of the end of the "Impingement" mixing of the polyol/diamine and isocyanate components.

4. Pins are pulled slightly before, at, or slightly after the completion of the material injection. Z(Example: For single cavity mold with 1.0 second mixing/injection time, pins are pulled at between 1.2 and 1.5 seconds.)

5. Materials generally are cured (gel) enough for de-molding within 10–60 seconds (This is dependent upon the cure rate of the system and temperature of the mold). Molded product can be left in the mold for longer periods of time if desired, with no detrimental effect on product properties.

Example II

Golf balls were produced using the following procedure:
Balls were molded on a Hennecke 55 RIM machine, with the following settings:
Machine Conditions/Settings:
Isocyanate temperature—120° F.
Polyol temperature—120° F.
Isocyanate and Polyol Tank Pressure—60 psi
Isocyanate pressure (recirculation/injection)—2800 psi
Polyol pressure (recirculation/injection)—2200 psi
Mold Temperature—160° F.
Throughput—34.1 gs
Injection Times:
Injection time—1.48 seconds
Pin Pull—1.48 seconds
Mold Open—45 seconds The covers of golf balls were molded using Bayflex 110-25, 110-35, and 110-50 Reaction Injection Molding System. Properties of the polyurethane materials used in the invention are described in Table 1.

TABLE 1

Polyurethane Properties (Bayer Bayflex Grades)

| Material Grade | Specific Gravity | Shore 'D' | Flex. Modulus | Mix Ratio Comp. A | Comp. B |
|---|---|---|---|---|---|
| Bayflex 110-25 | 1.4 | 50 | 25,000 psi | 47.5 | 100 |
| Bayflex 110-35 | 1.00 | 55 | 35,000 psi | 52.9 | 100 |
| Bayflex 110-50 | 1.04 | 58 | 52,000 psi | 58 | 100 |

Note: Test values of Polyurethane materials taken from Bayer Corporation product specifications.
Component A: Aromatic isocyanate prepolymer (Diphenylmethane diisocyanate prepolymer)
Component B: Polyether Polyol System containing an Aliphatic amine and an Aromatic diamine.

Components were balanced to produce acceptable ratio (as defined in Table 1) to produce reacted product.

TABLE 2

Examples of Invention

| Ball | Const. | Center | Atti Comp | Shore 'D' | C.O.R. 125 f/s | C.O.R. 150 f/s | C.O.R. 175 f/s | I.V. |
|---|---|---|---|---|---|---|---|---|
| Example 1 - 110-25 | Wound | Liquid | 88 | 52 | 0.766 | 0.745 | | 253.4 |
| Example 2 - 110-50 | Wound | Solid | 92 | 60 | 0.769 | 0.745 | | 253.8 |
| Titleist Professional | Wound | Liquid | 96.7 | 57 | 0.786 | 0.772 | | 254.8 |
| Example 3 - 110-35 | Wound | Solid | 104.9 | 54 | 0.793 | 0.774 | 0.749 | 255.7 |
| Maxfli Revolution | Wound | Solid | 88.9 | 57 | 0.790 | 0.768 | 0.743 | 256.5 |
| Example 4 - 110-50 | Solid | N/a | 79.3 | 60 | 0.773 | 0.738 | | 253.8 |
| Staff Titanium Balata | Solid | N/a | 87.7 | 57 | 0.788 | 0.756 | | 255.5 |
| Example 5 - 110-25 | Solid | N/a | 72.7 | 52 | 0.782 | 0.742 | | 253.3 |
| Example 6 - 110-35 | Solid | N/a | 73.1 | 58 | 0.781 | 0.741 | | 253.3 |
| SmartCore Balata Dist. | Solid | N/a | 65.2 | 57 | 0.782 | 0.743 | | 252.9 |

PGA Compression - Measured using the maximum reading on an Atti Compression machine.
Shore 'D' Hardness - Measured with a handheld or fixture mounted Shore D durometer with a maximum indicator in accordance with ASTM D2240 except that the measurement is made on the non-dimpled surface of the golf ball.
C.O.R. (125 ft/s) - Ratio of Outbound/Inbound velocity – 125 ft/s inbound velocity test setup.
C.O.R. (150 ft/s) - Ratio of Outbound/Inbound velocity – 150 ft/s inbound velocity test setup.
C.O.R. (175 ft/s) - Ratio of Outbound/Inbound velocity – 175 ft/s inbound velocity test setup.

Table 1 illustrates properties of Bayflex RIM polyurethane grades used as covers for golf balls molded using the process described in this invention. Table 2 illustrates properties of balls molded using the process described in this invention. The golf ball of Example 1 was molded using wound core having the following construction:

A liquid filled center, produced by Abbott Laboratories, having a diameter of 1.125 inches.

The center was wound with a thread comprising polyisoprene rubber, natural rubber, or a mixture thereof, manufactured by Fulflex.

The core was wound to a diameter of 1.57 inches.

The cover of Example 1 was molded using the Reaction Injection Molding Process, with conditions as defined in the above section. The material used in molding the core was Bayflex 110-25, which was introduced into the mixhead at a ratio of isocyanate:isocyanate reactive compound of 47.5:100. The 110-25 polyurethane has a Shore 'D' hardness of about 50–52.

The golf ball of Example 2 was molded using a wound core having the following construction:

A solid center, consisting of peroxide cured polybutadiene rubber, having a diameter of 1.125 inches.

The center was wound with a thread comprising polyisoprene rubber, natural rubber, or a mixture thereof, manufactured by Fulflex.

The core was wound to a diameter of 1.57 inches.

The cover of Example 2 was molded using the Reaction Injection Molding Process, with conditions as defined in the above section. The material used in molding the core was Bayflex 110-50, which was introduced into the mixhead at a ratio of isocyanate:isocyanate reactive compound of 58:100. The 110-50 polyurethane has a Shore 'D' hardness of about 60.

The golf balls of Example 1 and Example 2 were compared to the Titleist Professional golf ball, which has a cover comprising thermoset polyurethane, produced through a casting process. Results indicate that balls molded using the reaction injection molding process result in comparable Atti compression, cover (Shore 'D' hardness), and produce resilience properties acceptable for use as a premium golf ball.

The golf ball of Example 3 was molded using a wound core having the following construction:

A solid center, consisting of peroxide cured polybutadiene rubber, having a diameter of 1.125 inches.

The center was wound with a thread comprising polyisoprene rubber, natural rubber, or a mixture thereof, manufactured by Fulflex.

The core was wound to a diameter of 1.57 inches.

The cover of Example 3 was molded using the Reaction Injection Molding Process, with conditions as defined in the above section. The material used in molding the core was Bayflex 110–35, which was introduced into the mixhead at a ratio of isocyanate:isocyanate reactive compound of 52.9:100. The 110-35 polyurethane has a Shore 'D' hardness of about 57–58.

The golf ball of Example 3 was compared to the Maxfli Revolution golf ball, which also has a cover comprising thermoset polyurethane molded using a casting process. Results indicate that the ball molded using the reaction injection molding process produced comparable resilience properties and cover hardness to the Maxfli Revolution golf ball.

The golf ball of Example 4 was molded using a solid core, and thermoplastic mantle layer with the following construction:

The solid core was a peroxide cured polybutadiene rubber, having an Atti compression of about 65, and a diameter of 1.520 inches.

A mantle layer was molded around the solid core, the mantle layer being formed of an ionomer blend having a Shore 'D' hardness of about 70.

The diameter of the core and mantle layers was 1.575 inches.

The cover of Example 4 was molded using the Reaction Injection Molding Process, with conditions as defined in the above section. The material used in molding the core was Bayflex 110–50, which was introduced into the mixhead at a ratio of isocyanate:isocyanate reactive compound of 58:100. The 110-50 polyurethane has a Shore 'D' hardness of about 60.

The golf ball of Example 4 was compared to the Staff Titanium Balata golf ball, which utilizes the same core/mantle construction as used in Example 4, but utilizes a cover comprising a balata/polybutadiene lend, which is compression molded around the solid cores. Results indicate that the ball molded using the reaction injection molding process produces comparable cover hardness (Shore "D") to the Staff Titanium Balata, and compression (Atti) and resilience properties that would be considered acceptable for a premium golf ball.

The golf ball of Example 5 was molded using a solid core, and thermoplastic mantle (lattice) layer with the following construction:

The solid core was a peroxide cured polybutadiene rubber, having an Atti compression of about 70, and a diameter of 1.540 inches.

A partial inner cover layer surrounding the core, comprised of a number of lattice bands equally distributed around the surface of the golf ball, the intermediate lattice layer being formed of an ionomer blend having a Shore 'D' hardness of about 70.

The outer diameter of the lattice-banded portion of the core was 1.590–1.595 inches.

The cover of Example 5 was molded using the Reaction Injection Molding process, with conditions as defined in the above section. The material used in molding the core was Bayflex 110-25, which was introduced into the mixhead at a ratio of isocyanate:isocyanate reactive compound of 47.5:100. The 100-25 polyurethane has a Shore 'D' hardness of about 50–52.

The golf ball of Example 6 was molded using a solid core, and thermoplastic mantle (lattice) layer with the following construction:

The solid core was peroxide cured polybutadiene rubber, having an Atti compression of about 70, and a diameter of 1.540 inches.

A partial inner cover layer surrounding the core, comprised of a number of lattice bands equally distributed around the surface of the golf ball, the intermediate lattice layer being formed of an ionomer blend having a Shore 'D' hardness of about 70.

The outer diameter of the lattice-banded portion of the core was 1.590–1.595 inches.

The cover of Example 6 was molded using the reaction Injection Molding Process, with conditions as defined in the above section. The material used in molding the core was Bayflex 110-35, which was introduced into the mixhead at a ratio of isocyanate:isocyanate reactive compound of 52.9:100. The 110-35 polyurethane has a Shore 'D' hardness of about 57–58.

The golf balls of Examples 5 and 6 were compared to the SmartCore Balata Distance golf ball, which comprises a solid core having a compression of about 36, an inner cover layer comprising an ionomer blend having a Shore 'D' hardness of about 70, and a thermoset cover comprised of a blend of balata (trans-polyisoprene) and polybutadiene, having a Shore 'D' hardness of about 57. Results indicate that golf balls molded using the reaction injection molding process produce comparable Atti compression, cover hardness and resilience properties to the SmartCore Balata Distance ball.

In all cases, balls molded using a reaction injection molding process result in covers with properties which are acceptable for use as premium golf ball products. In all cases, these properties are comparable to thermoset materials that require a much more intensive, difficult and costly process to produce. Overall, the "Reaction Injection Molding" process is a significantly different, easier and less expensive method for producing a golf ball comprising a thermoset polyurethane cover.

In all cases, the RIM process allows the production of a golf ball comprising a thermoset cover in a molding process that has a mold close/mold open cycle time of 60 seconds (1 minute or less. It also allows for injecting of thermoset material into a closed mold, around a centered core. This is in contrast to methods of manufacture for castable polyurethane materials in which the material must be introduced into an open mold, and require molding times several times longer than necessary in the RIM process. The RIM process also allows for molding of thermoset materials, something that cannot be performed using conventional injection molding processes (as is currently used to mold ionomer covers on golf balls).

Figure 15:
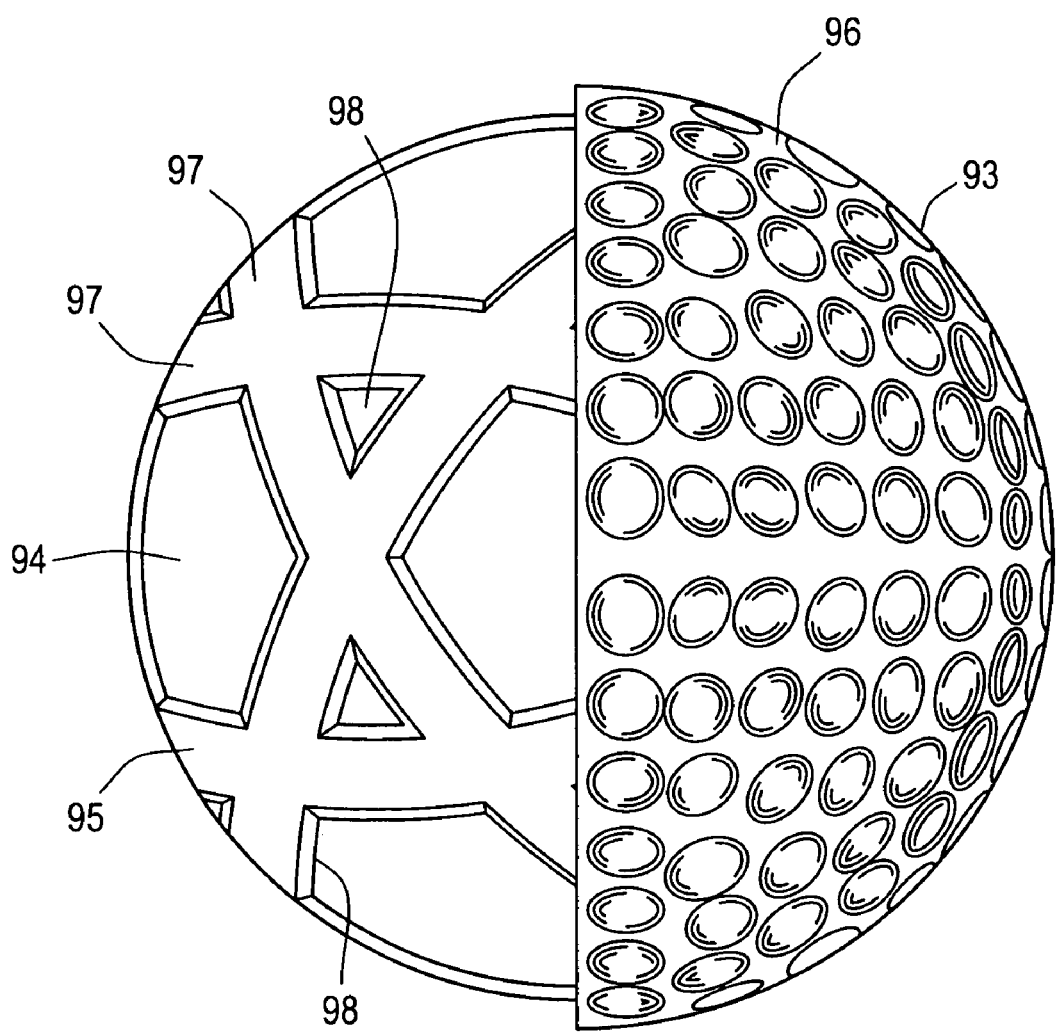
FIG. 15 illustrates a golf ball with a cover, a lattice structure, and a cover.

FIG. 15 illustrates a golf ball 93 which includes a core 94, a lattice structure 95, and a cover 96. The lattice structure is described in detail in co-owned U.S. patent application entitled "Golf Ball With Lattice Structure," Ser. No. 09/589,722, filed Jun. 8, 2000. The lattice structure includes bands 97 which extend outwardly from the spherical surface of the core. Openings 98 in the lattice expose portions of the surface of the core. The cover 96 extends over the lattice structure and extends downwardly into the openings 98 to contact the exposed portions of the core.

The core, lattice, and/or cover can be reaction injected molded from fast curing thermoset polyurthane as previously described.

While in the foregoing specification a detailed description of specific embodiments of the invention were set forth for the purpose of illustration, it will be understood that many of the details hereingiven can be varied considerably by those skilled in the art without departing from the spirit and scope of the invention.

We claim:

1. A method of forming a cover on a golf ball product comprising:

positioning a spherical uncovered golf ball product in the center of a mold, the mold having a spherical mold surface, closing the mold around the golf ball product, mixing a polyurethane prepolymer and a curing agent to form a thermoset reaction mixture, reaction injection molding the reaction mixture in the mold to form a golf ball cover layer over the golf ball product therein, allowing the reaction mixture to gel and form a golf ball, and opening the mold and removing the golf ball within about 10 to 60 seconds after the injecting step.

2. The method of claim 1 in which the spherical mold surface includes projections for forming dimples in the golf ball cover layer.

3. The method of claim 1 in which said step of injecting the reaction mixture into the closed mold is performed within 0.5 to 10 seconds.

4. The method of claim 1 in which the polyurethane prepolymer has a viscosity of less than 1000 cps at 25° C.

5. The method of claim 4 in which the curing agent has a viscosity of less than 2000 cps at 25° C.

6. The method of claim 1 in which the curing agent has a viscosity of less than 2000 cps at 25° C.

7. The method of claim 1 in which the uncovered golf ball product is a wound golf ball core.

8. The method of claim 1 in which the uncovered golf ball product is a solid core.

9. The method of claim 1 in which the uncovered golf ball product comprises a solid core and a mantle layer surrounding the core.

10. The method of clam 1 in which the uncovered golf ball product comprises a solid core and a lattice structure over the core.

11. The method of claim 1 in which the polyurethane prepolymer is selected from the class consisting of meta-toluene diisocyanate, 4,4'-diphenylmethane diisocyante, pmdi, 3,3'-dimethyl-4,4-biphenyl diisocyanate, naphthalene diisocyanate, and para-phenylene diisocyanate.

12. The method of claim 1 in which the mold is opened and the golf ball is removed about 45 seconds after the injecting step.

13. A method of producing a golf ball having a golf ball cover layer including a polyurethane, said method comprising:
providing a first reactant which is an isocyanate;
providing a second reactant selected from the group consisting of a polyol, a polyamine, and combinations thereof;
heating said first reactant to a temperature of from about 80° to about 130° F.;
heating said second reactant to a temperature of from about 80° to about 150° F.;
mixing said first reactant and said second reactant together to form a thermoset reaction mixture;
providing a molding assembly defining a molded cavity and having a golf ball component positioned within said molding cavity;
closing the molding assembly around the golf ball component;
reaction injection molding said thermoset reaction mixture in said molding cavity; and
molding a golf ball cover layer about said golf ball component from said thermoset reaction mixture, thereby producing said golf ball.

14. The method of claim 13 wherein said second reactant is a polyol.

15. The method of clam 13 further comprising:
heating said molding assembly to a temperature of about 140° to 170° F.

16. The method of claim 13 further comprising:
adding a density-increasing filler to at least one of said first reactant and said second reactant.

* * * * *